United States Patent [19]
Brown

[11] 3,760,483
[45] Sept. 25, 1973

[54] MOUNT SEALING APPARATUS
[76] Inventor: Gordon P. Brown, 36 Solmar Dr., Rochester, N.Y.
[22] Filed: Nov. 10, 1971
[21] Appl. No.: 197,427

[52] U.S. Cl. .............. 29/200 B, 29/243.54, 156/514
[51] Int. Cl. ..................... B23p 19/00, B23p 11/00
[58] Field of Search ..................... 29/200 B, 243.54, 29/200 R; 156/514

[56] References Cited
UNITED STATES PATENTS
| | | | |
|---|---|---|---|
| 3,303,687 | 2/1967 | Kaiser | 29/200 B |
| 3,310,450 | 3/1967 | Dedona et al. | 156/514 |
| 3,349,603 | 10/1967 | Lovig | 29/243.54 X |
| 3,357,084 | 12/1967 | Colautti et al. | 29/200 B |

Primary Examiner—Thomas H. Eager
Attorney—William H. J. Kline et al.

[57] ABSTRACT

Apparatus for sealing a mount for an information bearing medium, is adapted for use with a mount blank of the kind provided with (a) first and second mount sections constructed to be arranged in overlying relation, (b) several openings in the first mount section and (c) several pins projecting from the second mount section and constructed to respectively extend through the several openings upon arranging the first and second mount sections in overlying relation. The apparatus includes a mount folding assembly for arranging the first and second sections of such a mount blank in overlying relation so that the several pins respectively extend through the several openings. Moreover, a roller member and a mount back-up member of the apparatus are supported in spaced opposed relation for enabling the first and second overlying mount sections to be moved therebetween in a manner such that the second mount section will be disposed in abutment against the mount back-up member and the several pins will be deformed respectively over the several openings by the roller member to seal the mount.

9 Claims, 7 Drawing Figures

PATENTED SEP 25 1973  3,760,483
SHEET 1 OF 3
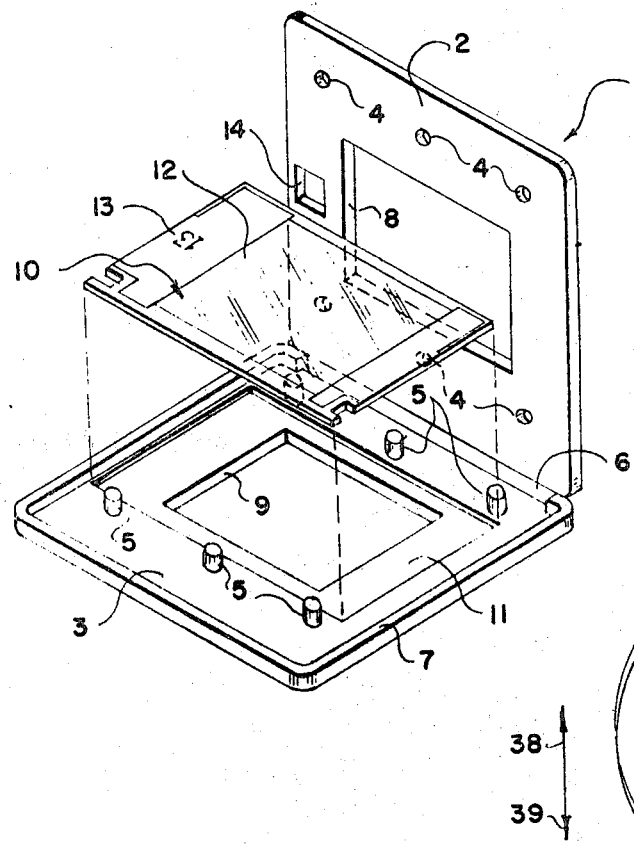
FIG.1
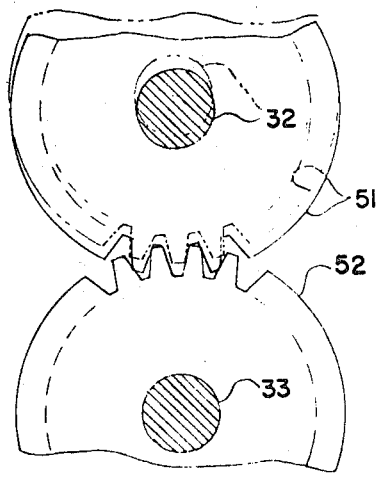
FIG.7
FIG.6
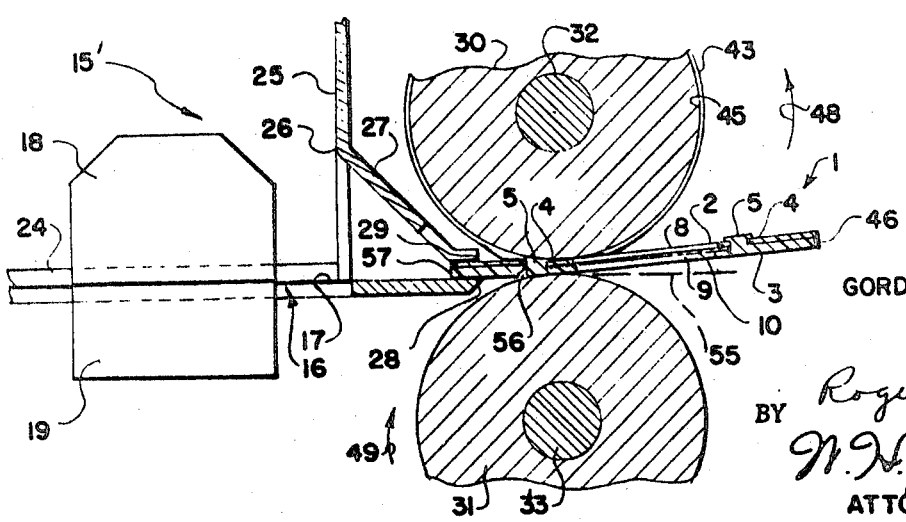
GORDON P. BROWN
INVENTOR.
BY Roger A. Fields
W. W. J. Kline
ATTORNEYS

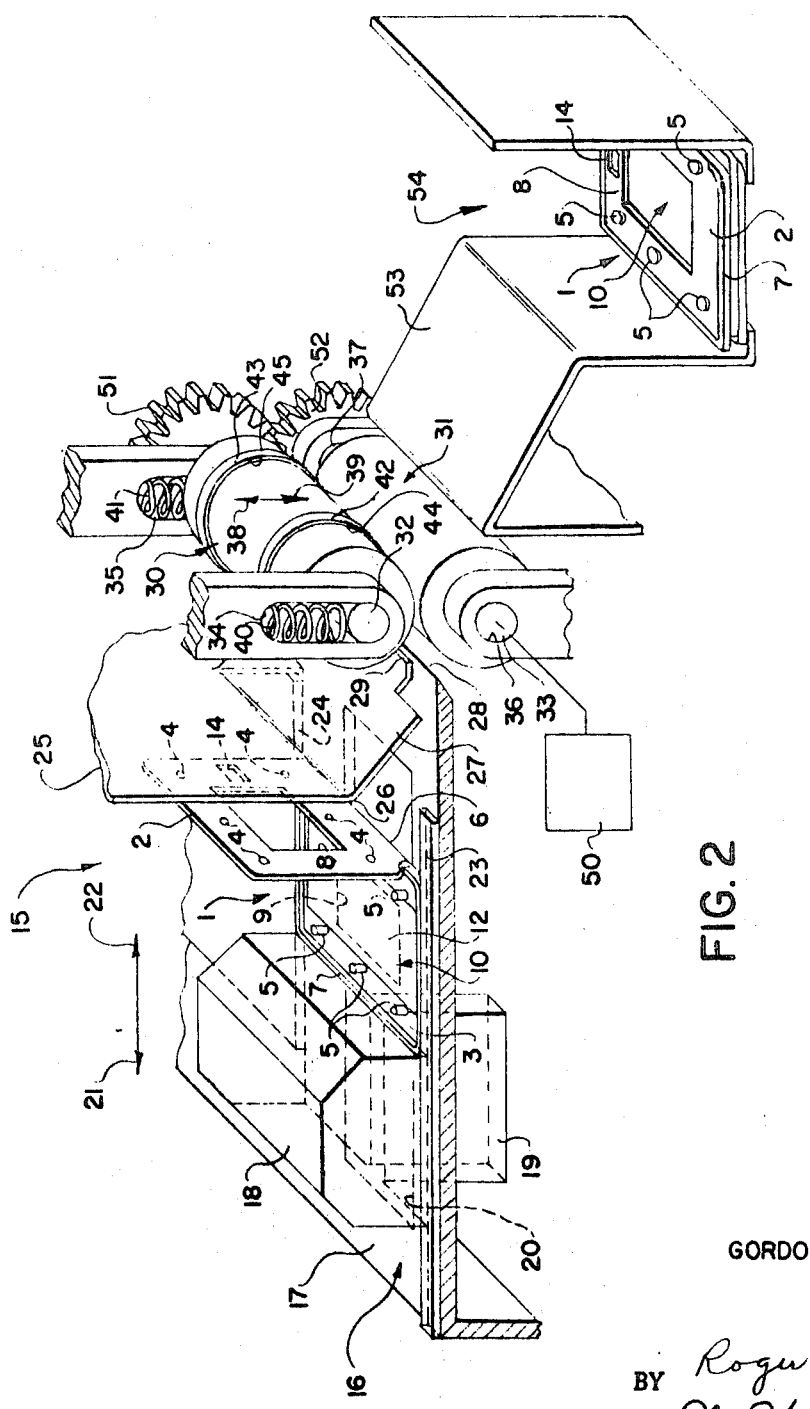

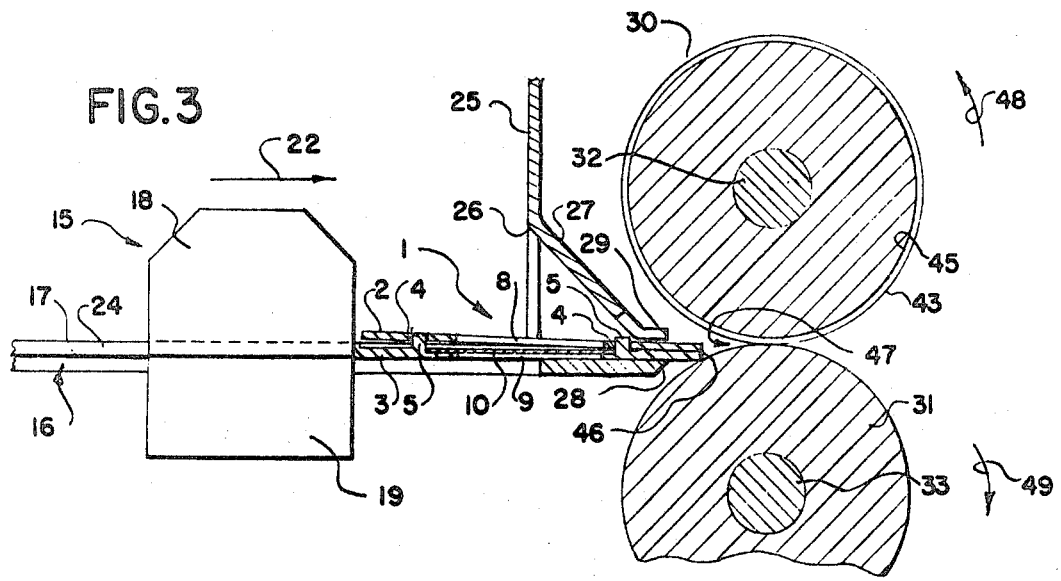
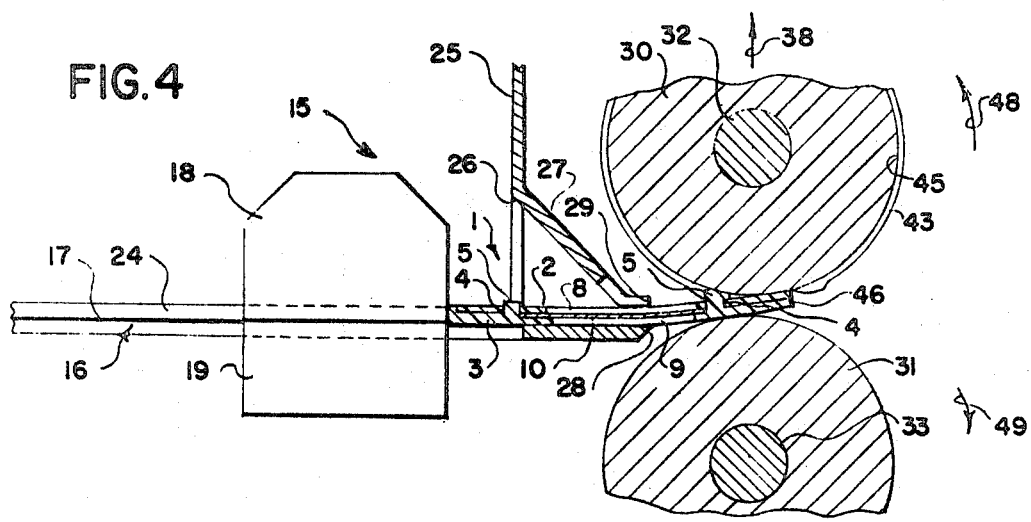
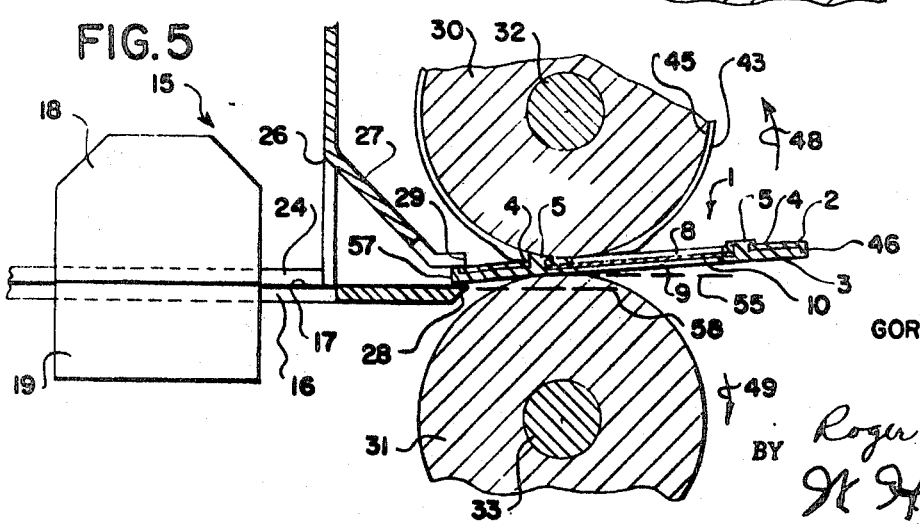

MOUNT SEALING APPARATUS

CROSS REFERENCE TO RELATED APPLICATIONS

Reference is made to commonly assigned copending U.S. Patent Application Ser. No. 197,426, entitled Mount Sealing Apparatus, filed in the name of David N. Schwardt on Nov. 10, 1971.

BACKGROUND OF THE INVENTION

1. Field of the Invention

The present invention relates to apparatus for sealing a mount for an information bearing medium such as a photographic print or transparency. More particularly, this invention relates to a mount sealing apparatus for sealing a mount blank of the kind provided with (a) first and second mount sections adapted for arrangement in overlying relation, (b) several openings in the first mount section and (c) several pins projecting from the second mount section and adapted to respectively extend through the several openings upon arranging the first and second mount sections in overlying relation.

2. Description of the Prior Art

It is oftentimes desirable to support an information bearing medium on a card or mount, whereby information on such medium may be correlated with information on the mount and/or the mount may serve as a convenient means for handling such medium. this has been accomplished in the past by first providing a mount blank, comprised of two sections foldable about a hinge portion or crease-line extending between the mount sections. The two mount sections are each formed with a window aperture; the window apertures being disposed to register upon folding the mount blank about the crease-line and arranging the mount sections in overlying relation. Prior to folding the mount blank, an information bearing medium is placed on one of the two mount sections across a window aperture so that, upon arranging the mount sections in overlying relation, the information bearing medium will be located between the mount sections and will be visible through either of the window apertures. Thereafter, to maintain the information bearing medium within the confines of the window apertures, the two overlying mount sections are sealed together, generally by pressure activated or temperature-activated activated adhesive material disposed on the interior face of at least one of the mount sections.

One instance of the foregoing practice which has gained wide-spread acceptance is found in the photographic field. Here, film chips or picture frames are cut from an exposed filmstrip and sealed within a mount, for viewing generally by image projection. Examples of apparatus for severing a film chip from a filmstrip, depositing the severed chip in a mount blank, and sealing the blank are disclosed in Canadian Patent No. 724,410, issued on Dec. 28, 1965 and U.S. Pat. No. 3,310,450, issued on Mar. 21, 1967. Such apparatus is adapted to seal the mount blank by applying heat or pressure to the two overlying mount sections, whereby adhesive material disposed on the interior face of one of the mount sections will be activated.

Contrary to this apparatus, the apparatus of the present invention is adapted to seal a mount blank of the kind provided with first and second mount sections which can likewise be arranged in overlying relation, but which include several openings in the first mount section and several pins projecting from the second mount section. The several pins are constructed to respectively extend through the several openings upon arranging the first and second mount sections in overlying relation. Since such a mount blank can be sealed by deforming the several pins respectively over the several openings (after arranging the first and second mount sections in overlying relation), no pressure-activated or temperature activated adhesive material is required.

SUMMARY OF THE INVENTION

It is an object of the present invention to provide an improved apparatus for sealing a mount for an information bearing medium such as a photographic print or transparency.

Another object of the present invention is to provide a mount sealing apparatus for sealing a mount blank of the kind provided with (a) first and second mount sections adapted for arrangement in overlying relation, (b) several openings in the first mount section and (c) several pins projecting from the second mount section and adapted to respectively extend through the several openings upon arranging the first and second mount sections in overlying relation.

In accordance with a preferred embodiment of the present invention there is disclosed hereinafter apparatus for sealing a mount for an information bearing medium, wherein the mount blank is of the kind described immediately above. Such apparatus includes a mount folding assembly for arranging the first and second mount sections in overlying relation so that the several pins respectively extend through the several openings. Moreover, the apparatus includes a roller member adapted to deform the several pins respectively over the several openings of a mount (whose first and second mount sections are arranged in overlying relation) and a mount back-up member. The roller member and the mount back-up member are supported in spaced opposed relation for enabling the first and second overlying mount sections to be moved therebetween in a manner such that the second mount section will be disposed in abutment against the mount back-up member and the several pins will be deformed respectively over the several openings by the roller member. In this way, the mount will be sealed without the use of pressure-activated or temperature-activated adhesives as done generally in the past.

BRIEF DESCRIPTION OF THE DRAWINGS

The above-mentioned and other features and objects of the present invention and the manner of obtaining them will become more apparent by reference to the following detailed description of a preferred embodiment of such invention taken in conjunction with the accompanying drawings wherein:

FIG. 1 is a perspective view of a mount blank and an information bearing medium, with which the mount sealing apparatus of the present invention can be used;

FIG. 2 is a perspective view of the mount sealing apparatus according to a preferred embodiment of the present invention and showing the mount blank and the information bearing medium as they are initially received by such apparatus, for mount sealing;

FIGS. 3, 4 and 5 are side elevation views, in section, of a segment of the mount sealing apparatus, showing the manner in which the mount blank is first folded about the information bearing medium and then sealed by the mount sealing apparatus;

FIG. 6 is a view similar to FIG. 5, but further showing a mount sealing apparatus arrangement whereby the mount blank will be fractured during mount sealing;

FIG. 7 is a side elevation view of a segment of the mount sealing apparatus, showing two cooperating gear wheels which provide a driving connection between a pin deforming roller member and a mount back-up roller member of the mount sealing apparatus.

DESCRIPTION OF THE PREFERRED EMBODIMENT

It may be well, before proceeding with the description of a preferred embodiment of the present invention, to first consider a mount blank 1 with which such invention embodiment can be used. As best shown in FIG. 1, the mount blank 1 is generally of the kind provided with (a) first and second mount sections 2 and 3 adapted to be arranged in overlying superimposed relation, (b) several openings 4 in the first mount section and (c) several pins 5 projecting from the second mount section and adapted to respectively extend through the several openings upon arranging the first and second mount sections in overlying relation. More specifically, the two mount sections 2 and 3 are separated by a hinge or crease-line 6 extending therebetween, whereby the mount blank 1 can be readily folded about the crease-line so as to arrange the mount sections in overlying relation and cause the several pins 5 to respectively extend through the several openings 4. Also, the second mount section 2 includes a frame or peripherally raised portion 7 which is constructed so that, upon arranging the first and second mount sections 2 and 3 in overlying relation, the first mount section will be snugly received within the frame portion.

Further as shown in FIG. 1, two window apertures 8 and 9 are formed in the first and second mount sections 2 and 3; the window apertures being disposed to register upon arranging the mount sections in overlying relation. Prior to folding the mount blank 1 about the crease-line 6, an information bearing medium, illustrated as a photographic transparency or film chip 10 which has been severed by an appropriate cutting mechanism (not shown) from a roll of exposed film, is placed on the second mount section 3 within a nest or relieved area 11 disposed about the window aperture 9. Upon arranging the first and second mount sections 2 and 3 in overlying relation, the film chip 10 will be located between the mount sections and a picture portion 12 of the film chip will be visible through either of the window apertures 8 and 9. Moreover, an identification or index number 13, imprinted on the film chip 10, will be visible through a window aperture 14 in the first mount section 2. Thereafter, to maintain the first and second mount sections 2 and 3 in overlying relation and thus secure the film chip 10 in proper relative position with the window apertures 8, 9 and 13, the mount sections should be sealed together.

Coming now to a preferred embodiment of the present invention, there is shown in FIG. 2, a mount sealing apparatus generally indicated by the reference number 15. The mount sealing apparatus 15 is provided with a table or platform 16 having a substantially planar top surface 17 along which a carriage member 18 can be moved. A depending bottom fin 19 of the carriage 18 extends within a guide slot 20 which is formed in the table surface 17, thereby restricting the carriage to movement along the table surface in opposite directions generally indicated by arrows 21 and 22. Should an open mount blank 1 including a film chip 10 be placed on the table surface 17 in the manner illustrated by FIG. 2 and the carriage 18 then moved along the table surface in the direction indicated by the arrow 22, the mount blank will accordingly be pushed in the same direction. Two parallel spaced bars 23 and 24, projecting from the table surface 17, serve as edge-guiding supports for the second mount section 3 as the mount blank 1 is moved along the table surface.

Upon initial movement of the carriage 18 and the mount blank 1 along the table surface 17, in the direction indicated by the arrow 22, the first mount section 2 will be advanced into abutment against a wall member 25 which, as viewed in FIG. 2, is disposed above and spaced from the table surface. Upon continued movement of the carriage 18 aand the mount blank 1, in the same manner, the mount blank will be advanced between the table surface 17 and a bottom edge 26 of the wall 25, thereby causing the first mount section 2 to pivot about the mount crease-line 6 toward the second mount section 3. A mount cam plate 27, extending from the wall edge 26 and inclined toward a mount exit edge 28 of the table surface 17, serves to further pivot the first mount section 2 toward the second mount section 3. Accordingly, as shown in FIG. 3, upon passing between the table edge 28 and a free edge 29 of the mount cam plate 27, the first and second mount sections 2 and 3 will be arranged in substantially overlying relation so that the several pins 5 respectively extend through the several openings 4.

Located immediately downstream from the table edge 28 and the plate edge 29, there is shown in FIG. 2, a first and second roller members 30 and 31 which are supported in parallel spaced relation for enabling a closed or folded mount blank 1 (i.e. a mount blank whose mount sections 2 and 3 are disposed in overlying relation) to be moved between such roller members. Roller member shafts 32 and 33 extend respectively within bearing slots 34, 35 (spaced on either side of the first roller member 30) and bearing apertures 36, 37 (spaced on either side of the second roller member 31). Since the bearing slots 34, 35 and the bearing apertures 36, 37 are disposed in fixed spaced relation, the first roller 30 is supported for movement toward and away from the second roller 31 in opposite directions generally indicated by arrows 38 and 39 (see FIG. 2). Moreover, the bearing slots 34, 35 and the bearing apertures 36, 37 are spaced from each other so as to effect (1) a minimum spaced distance between the rollers 30 and 31 which is slightly less than the combined thickness dimension of the overlying mount sections 2 and 3, and (2) a maximum spaced distance between the rollers which is substantially greater than the combined thickness dimension of the overlying mount sections. The significance of such minimum and maximum spacing between the rollers 30 and 31 will become apparent hereinafter. To normally maintain a minimum spaced distance between the first and second rollers 30 and 31, helical compression springs 40 and 41 are disposed within the bearing slots 34 and 35 in the manner illustrated by FIG. 2, so as to urge the first roller toward the second roller.

Two resiliently compressible annulus members 42 and 43, preferably in the form of rubber O-rings, are disposed peripherally about spaced segments of the first roller 30 and normally in abutment against the second roller 31 (see FIG. 2). The O-rings 42 and 43 are partially received in circumferential grooves 44 and 45 on the first roller 30, so as to secure the O-rings on the first roller for rotation therewith.

Referring now to FIG. 3, upon exiting from between the table edge 28 and the plate edge 29 a leading end 46 of the folded mount blank 1 is first advanced into abutment against the second roller 31 and then deflected by the second roller into abutment against the first roller 30 at a location within the roller nip 47. Thereafter, the mount blank 1 is moved between the first and second rollers 30 and 31 in the manner illustrated by FIGS. 4 and 5, so that the second mount section 3 will ride over the second roller (which now serves as a mount back-up or support roller) and the several mount pins 5 will be deformed or flattened respectively over the several mount openings 4 by the first roller. Such pin deforming results from the rigid composition of the rollers 30 and 31, which are preferably constructed of a metal-like material. The O-rings 43 and 44 are spaced apart on the first roller 30 in order to bypass the several mount pins 5 as the overlying mount sections 2 and 3 are moved between the first and second rollers (see FIGS. 4 and 5). Moreover, since the O-rings 43 and 44 are disposed to normally abut against the second roller 31, the O-rings will ensure that the mount sections 2 and 3 remain in overlying relation during the roller-induced mount flexing, occurring as an incident to the pin deforming (see FIG. 4). Accordingly, upon deforming the several mount pins 5 over the several mount openings 4, the mount blank 1 will be sealed with the film chip 10 securely held in place between the overlying mount sections 2 and 3.

To facilitate movement of the folded mount blank 1 between the first and second rollers 30 and 31, the rollers (and the O-rings 43 and 44) are driven in opposite rotational directions generally indicated by reference numbers 48 and 49 (see FIG. 3). Such rotational drive of the rollers 30 and 31 is effected by an appropriate drive motor 50 and by two gear wheels 51 and 52, which are disposed on the roller shafts 32 and 33 so as to provide a driving connection between the rollers (see FIGS. 2 and 7). Upon introduction of the leading end portion 46 of the folded mount blank 1 into the roller nip 47, the rubber O-rings 43 and 44 serve to draw the mount blank between the rollers 30 and 31 (see FIG. 3). Thereafter, once the several mount pins 5 are formed over the several mount openings 4, the sealed mount blank 1 is ejected from between the first and second rollers 30 and 31 (see FIG. 5), and advanced down a slide 53 into a collection bin 54 (see FIG. 2).

As can best be seen from FIGS. 2-4 when the folded mount blank 1 is received between the first and second rollers 30 and 31, the first roller is slightly moved away from the second roller (against the urging of the springs 40 and 41) in the direction indicated by the arrow 38, since the combined thickness dimension of the overlying mount sections 2 and 3 is slightly greater than the minimum spaced distance between the rollers (as described in detail hereinbefore). In this way, the rollers 30 and 31 will be brought to bear firmly against the overlying mount sections 2 and 3 so as to effect deformation of the several mount pins 5 over the several mount openings 4 (see FIG. 4). Such movement of the first roller 30 away from the second roller 31 does not disconnect the gear wheels 51 and 52, as schematically illustrated in FIG. 7. If for some reason the operator wishes to further space the first and second rollers 30 and 31 when a mount blank 1 is located therebetween, in order to remove the mount blank, the first roller can be manually moved in the direction indicated by the arrow 38 until the maximum spaced distance between the rollers is reached.

Referring now to FIG. 6, there is illustrated a mount sealing arrangement 15' which differs from the mount sealing apparatus 15 previously described, in that the table surface 17 and a tangent plane 55 of the second roller 31 (extending between the last-mentioned roller and the first roller 30) are disposed in particular coplanar relation. Such coplanar relation between the table surface 17 and the tangent plane 55 is suggested by the prior art, as described in commonly assigned copending U.S. Pat. Application Ser. No. 197,426 more fully referenced hereinbefore. In contrast, for the mount sealing apparatus 15 as shown in FIG. 5, the table surface 17 is disposed substantially parallel to the tangent plane 55 in a manner such that the table surface effects a mount guide plane 58 which intersects the second roller 31. It was determined that in using the mount sealing arrangement 15', the mount blank 1 which is preferably formed of plastic material tended to develop fractures 56 rearward of a trailing row of the mount pins 5, as an incident to the deforming of such pins by the roller 30 (see FIG. 6). As can be seen in FIG. 6, the table surface 17 and the tangent plane 55 are disposed, such that the table surface and the rollers 30 and 31 cooperate to severely flex and thus fracture the overlying mount sections 2 and 3 rearward of the trailing row of pins 5. More specifically, since a trailing end 57 of the mount blank 1 is prevented by the table surface 17 from moving in a counterclockwise direction as viewed in FIG. 6, the fractures 56 result. Such fractures 56 are not produced in the portion of the mount blank 1 between the trailing and leading row of pins 5, since the presence of the mount windows 8 and 9 within such portion (see FIG. 4) allow for substantially greater mount flexing here (as compared to the portion of the mount blank between the trailing row of pins and the mount end 57).

It was further determined that if the table surface 17 was disposed so that the mount guide plane 58 extends substantially parallel to the tangent plane 55 and intersects the second roller 31, as in FIG. 5, then sufficient clearance between the table surface and the trailing end 57 of the folded mount blank 1 would be provided in order to avoid mount fracture during pin deforming. That is to say, if the table surface 17 was arranged in a manner causing a folded mount blank 1 advanced along the guide plane 38 to be initially deflected by the second roller 31 toward the first roller 30 and then moved between the first and second rollers, flexing of the mount blank between the trailing row of pins 5 and the mount end 57 would be significantly reduced (as compared to the example shown in FIG. 6) and mount fracture would be avoided.

Although not specifically illustrated herein, one having ordinary skill in the art will appreciate that the mount blank 1 can be manually folded by the operator (so that the mount sections 2 and 3 are disposed in overlying relation) and then advanced along the table surface 17 for entry between the rollers 30 and 31. Of course, such arrangement would not require the previously described mount cam plate 27 and the wall 25. It will be further appreciated that although the mount sealing apparatus 15 has been considered for use with the specific mount blank 1 and the film chip 10, other information bearing mediums may be sealed within other modified mount blanks.

The present invention has been described in detail with particular reference to a preferred embodiment thereof, but it will be understood that variations and modifications can be effected within the spirit and scope of the invention.

I claim:

1. Apparatus for sealing a mount for an information bearing medium, the mount being of the kind provided with (a) first and second overlying mount sections, (b) several openings in the first mount section and (c) several pins projecting from the second mount section to respectively extend through the several openings, and said mount sealing apparatus comprising:
   a roller member adapted to deform the several pins respectively over the several openings of such a mount;
   means for supporting such a mount;
   means for supporting said roller member and said mount supporting means in spaced opposed relation for enabling a mount to be moved therebetween in a manner such that the second mount section will be disposed in abutment against said mount supporting means and the several pins will be deformed respectively over the several openings by said roller member.

2. Mount sealing apparatus as recited in claim 1, wherein such a mount has a given thickness, and wherein said means for supporting said roller member and said mount supporting means includes:
   means for mounting said roller member for movement toward and away from said mount supporting means;
   means for urging said roller member toward said mount supporting means; and
   means for restricting movement of said roller member toward said mount supporting means for effecting a minimum spaced, distance therebetween which is slightly less than the given thickness of such a mount.

3. Mount sealing apparatus as recited in claim 1, wherein said mount supporting means includes:
   a roller member adapted to support such a mount.

4. Apparatus for sealing a photographic material mount of the kind provided with (a) first and second mount sections adapted for arrangement in overlying relation, (b) several openings in the first mount section and (c) several pins projecting from the second mount section and adapted to respectively extend through the several openings upon arranging the first and second mount sections in overlying relation, said mount sealing apparatus comprising:
   means for arranging the first and second mount sections of such a mount in overlying relation so that the several pins respectively extend through the several openings;
   a roller member adapted to deform the several pins respectively over the several openings of a mount whose first and second mount sections are arranged in overlying relation;
   means for supporting a mount whose first and second mount sections are arranged in overlying relation; and
   means for supporting said roller member and said mount supporting means in spaced opposed relation for enabling a mount whose first and second mount sections are arranged in overlying relation to be moved between said roller member and said mount supporting means in a manner such that the second mount section will be disposed in abutment against said mount supporting means and the several pins will be deformed respectively over the several openings by said roller member.

5. Mount sealing apparatus as recited in claim 4, wherein said mount arranging means includes:
   means defining a substantially planar surface along which such a mount can be advanced in a predetermined direction toward said roller member and said mount supporting means;
   a mount cam plate;
   means for supporting said planar surface and said mount cam plate in converging, sapced relation and so as to converge generally in said predetermined direction.

6. Apparatus for sealing a photographic material mount of the kind provided with (a) first and second mount sections adpated for arrangement in overlying relation, (b) several openings in the first mount section and (c) several pins projecting from the second mount section and adapted to respectively extend through the several openings upon arranging the first and second mount sections in overlying relation, said mount sealing apparatus comprising:
   means for arranging the first and second mount sections of such a mount in overlying relation so that the several pins respectively extend through the several openings;
   a roller member adapted to deform the several pins respectively over the several openings of a mount whose first and second mount sections are arranged in overlying relation;
   a roller member adapted to support a mount whose first and second mount sections are arranged in overlying relation;
   drive means for rotating said pin deforming and mount supporting roller members in opposite directions; and
   means for supporting said pin deforming and mount supporting roller members in spaced opposed relation for enabling a mount whose first and second mount sections are arranged in overlying relation to be moved between said roller members in a manner such that the second mount section will be disposed in abutment against said mount supporting roller member and the several pins will be deformed respectively over the several openings by said pin deforming roller member.

7. Mount sealing apparatus as recited in claim 6 further comprising:
   means disposed peripherally about a segment of said pin deforming roller member for ensuring that the first and second mount sections of such a mount remain in overlying relation upon movement between said pin deforming and mount supporting roller members.

8. Mount sealing apparatus as recited in claim 7, wherein said ensuring means includes:

a resiliently compressible annulus member projecting from said pin deforming roller member; and means for securing said annulus member on said pin deforming roller member for rotation therewith.

9. Mount sealing apparatus as recited in claim 6, further comprising:

a resiliently compressible annulus member disposed peripherally about a segment of said pin deforming roller member and in abutment against said mount supporting roller member; and means for securing said annulus member on said pin deforming roller member for rotation therewith.

* * * * *